United States Patent
Lee et al.

(10) Patent No.: US 8,514,783 B2
(45) Date of Patent: Aug. 20, 2013

(54) METHOD AND APPARATUS FOR TRANSMITTING SIGNAL IN WIRELESS COMMUNICATION SYSTEM

(75) Inventors: Moon Il Lee, Gyeongki-do (KR); So Yeon Kim, Gyeongki-do (KR); Jae Hoon Chung, Gyeongki-do (KR); Hyun Soo Ko, Gyeongki-do (KR); Seung Hee Han, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 282 days.

(21) Appl. No.: 13/057,237

(22) PCT Filed: Aug. 5, 2009

(86) PCT No.: PCT/KR2009/004383
§ 371 (c)(1),
(2), (4) Date: Feb. 2, 2011

(87) PCT Pub. No.: WO2010/016729
PCT Pub. Date: Feb. 11, 2010

(65) Prior Publication Data
US 2011/0134849 A1    Jun. 9, 2011

Related U.S. Application Data

(60) Provisional application No. 61/086,456, filed on Aug. 5, 2008.

(30) Foreign Application Priority Data

Jan. 29, 2009    (KR) .................. 10-2009-0006826

(51) Int. Cl.
*H04W 4/00*    (2009.01)

(52) U.S. Cl.
USPC ........................................... 370/328

(58) Field of Classification Search
USPC ......... 370/203, 204–215, 229–240, 310–337,
370/338–350, 351–394, 395.1, 395.3, 395.4,
370/395.41, 395.42, 395.5, 395.52, 395.53,
370/412–421, 431–457, 458–463, 464–497,
370/498–522, 523–529
See application file for complete search history.

(56) References Cited

U.S. PATENT DOCUMENTS

2004/0077378 A1* 4/2004 Kim et al. .................. 455/562.1
2006/0077886 A1* 4/2006 Oh et al. ....................... 370/208
(Continued)

FOREIGN PATENT DOCUMENTS

| KR | 2004-0003537 | 1/2004 |
|----|--------------|--------|
| KR | 2006-0032765 | 4/2006 |
| WO | 03/021795 | 3/2003 |
| WO | 20081044830 | 4/2008 |

OTHER PUBLICATIONS

International Search Report from PCT/KR2009/004383.

*Primary Examiner* — Jung-Jen Liu
(74) *Attorney, Agent, or Firm* — Morgan, Lewis & Bockius LLP

(57) ABSTRACT

A method and an apparatus for transmitting data in a wireless communication system are provided. The method includes receiving cyclic shift information indicating a first cyclic shift value, obtaining a second cyclic shift value from the first cyclic shift value, transmitting a first signal based on the first cyclic shift value through a first antenna, and transmitting a second signal based on the second cyclic shift value through a second antenna, wherein the first signal and the second signal are transmitted on the same radio resource.

8 Claims, 10 Drawing Sheets

(56) References Cited

U.S. PATENT DOCUMENTS

| | | | |
|---|---|---|---|
| 2009/0181687 A1* | 7/2009 | Tiirola et al. | 455/450 |
| 2009/0196240 A1* | 8/2009 | Frederiksen et al. | 370/329 |
| 2009/0201863 A1* | 8/2009 | Pi | 370/329 |
| 2009/0249027 A1* | 10/2009 | Kim et al. | 712/5 |
| 2009/0262856 A1* | 10/2009 | Onggosanusi et al. | 375/267 |
| 2010/0034312 A1* | 2/2010 | Muharemovic et al. | 375/267 |

* cited by examiner

Fig. 12
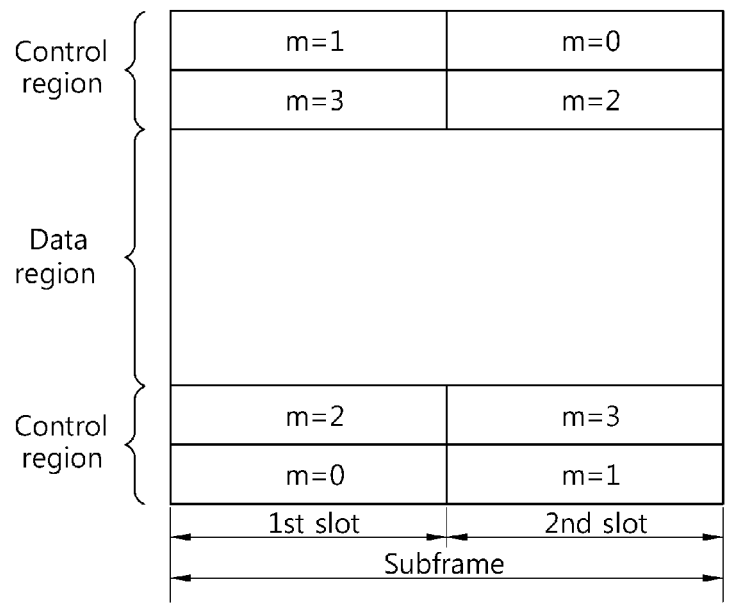
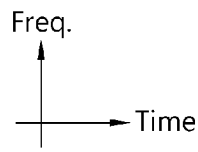
Fig. 13
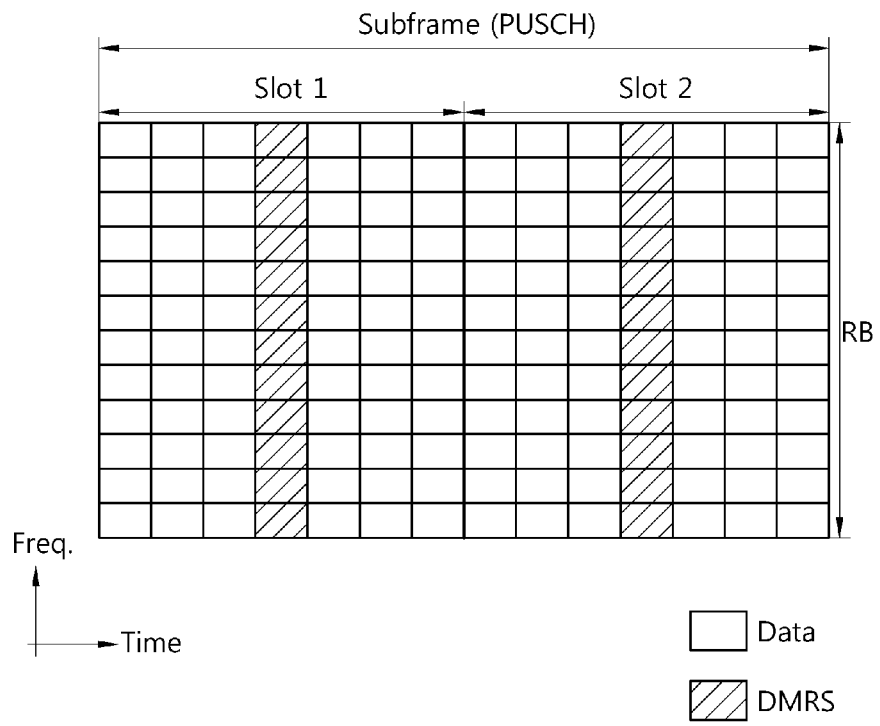

METHOD AND APPARATUS FOR TRANSMITTING SIGNAL IN WIRELESS COMMUNICATION SYSTEM

The present application is a national stage of PCT International Application No. PCT/KR2009/004383, filed Aug. 5, 2009, and claims the benefit of U.S. Provisional Application No. 61/086,456, filed Aug. 5, 2008. The present national stage application also claims the benefit of Korean Patent Application No. 10-2009-0006826, filed Jan. 29, 2009.

TECHNICAL FIELD

The present invention relates to wireless communications, and more particularly, to a method and an apparatus for transmitting a signal in a wireless communication system.

BACKGROUND ART

In next generation multimedia mobile communication systems, which have been actively studied in recent years, there is a demand for a system capable of processing and transmitting a variety of information (e.g., video and radio data) in addition to the early-stage voice service. Wireless communication systems are designed for the purpose of providing reliable communication to a plurality of users irrespective of users' locations and mobility. However, a wireless channel has an abnormal characteristic such as path loss, noise, fading due to multipath, an inter-symbol interference (ISI), the Doppler effect due to mobility of a user equipment, etc. Therefore, various techniques have been developed to overcome the abnormal characteristic of the wireless channel and to increase reliability of wireless communication.

Multiple input multiple output (MIMO) is a technique for supporting reliable high-speed data services. The MIMO technique improves data transmission/reception efficiency by using multiple transmit (Tx) antennas and multiple receive (Rx) antennas. Examples of the MIMO technique include spatial multiplexing, transmit diversity, beamforming, etc. A MIMO channel matrix depending on the number of Rx antennas and the number of Tx antennas can be decomposed into a plurality of independent channels. Each independent channel is referred to as a layer or a stream. The number of layers is referred to as a rank.

In general, the wireless communication system is a multiple access system capable of supporting communication with multiple users by sharing available system resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

While having almost the same complexity as OFDMA, SC-FDMA has a lower peak-to-average power ratio (PAPR) due to a single carrier property. Since the low PAPR is advantageous for a user equipment (UE) in terms of Tx power efficiency, the SC-FDMA is adopted for uplink transmission in a 3rd generation partnership project (3GPP) long term evolution (LTE) as disclosed in section 5 of the 3GPP TS 36.211 V8.2.0 (2008-March) "Technical Specification Group Radio Access Network; Evolved Universal Terrestrial Radio Access (E-UTRA); Physical channels and modulation (Release 8)". The 3GPP standard defines only single-stream transmission using a single Tx antenna in uplink.

Meanwhile, as a mobile communication system of a next generation (i.e., post-3rd generation), an international mobile telecommunication-advanced (IMT-A) system is standardized aiming at support of an Internet protocol (IP)-based seamless multimedia service in an international telecommunication union (ITU) by providing a high-speed data rate of 1 gigabits per second (Gbps) in downlink communication and 500 megabits per second (Mbps) in uplink communication. In the 3GPP, a 3GPP long term evolution-advanced (LTE-A) system is considered as a candidate technique for the IMT-A system. The LTE-A system is evolved to increase a completion level of the LTE system, and is expected to maintain backward compatibility with the LTE system. This is because the provisioning of compatibility between the LTE-A system and the LTE system is advantageous in terms of user convenience, and is also advantageous for a service provider since existing equipment can be reused.

The LTE-A system particularly requires improvement of a maximum uplink transfer rate. However, single-antenna-based SC-FDMA has a difficulty in satisfying a maximum transfer rate required by the IMT-advanced system. Therefore, a system in which a MIMO system is combined with the conventional SC-FDMA is considered as a system for improving a transfer rate.

Accordingly, there is a need for a method for effectively transmitting a signal in an SC-FDMA-based multiple antenna system.

DISCLOSURE OF INVENTION

Technical Problem

The present invention provides a method and an apparatus for transmitting a signal in a wireless communication system.

Technical Solution

In a aspect, a method for transmitting a signal in a wireless communication system, carried in a user equipment (UE), is provided. The method includes receiving cyclic shift information indicating a first cyclic shift value from a base station (BS), obtaining a second cyclic shift value from the first cyclic shift value, transmitting a first signal based on the first cyclic shift value through a first antenna to the BS, and transmitting a second signal based on the second cyclic shift value through a second antenna to the BS, wherein the first signal and the second signal are transmitted on the same radio resource.

Preferably, the radio resource comprises a single carrier-frequency division multiple access (SC-FDMA) symbol and a subcarrier.

Preferably, the first signal is for first data, and the second signal is for second data.

Preferably, the first data and the second data are the same.

Preferably, the first signal is a first DMRS (demodulation reference signal), and the second signal is a second DMRS.

The method may further include receiving radio resource information indicating the radio resource from the BS, and comparing a size of the radio resource with a threshold, wherein, if the size of the radio resource is less than or equal to the threshold, a difference between the first cyclic shift value and the second cyclic shift value is greater than a maximum delay spread, and if the size of the radio resource is greater than the threshold, the difference between the first cyclic shift value and the second cyclic shift value is less than the maximum delay spread.

Preferably, the radio resource information and the cyclic shift information are received on a physical downlink control channel (PDCCH), and the first signal and the second signal are transmitted on a physical uplink shared channel (PUSCH).

Preferably, the SC-FDMA symbol is divided into a plurality of windows in a time domain, the first cyclic shift value and the second cyclic shift value belong to different windows, and a window duration of each of the plurality of windows is determined in accordance with a maximum delay spread.

Preferably, the SC-FDMA symbol is divided into a plurality of windows in a time domain, and the first cyclic shift value and the second cyclic shift value belong to the same window, and a window duration of each of the plurality of windows is determined in accordance with a maximum delay spread.

Preferably, whether a difference between the first cyclic shift value and the second cyclic shift value is greater than a maximum delay spread is determined in accordance with a transmit antenna scheme.

In another aspect, an apparatus for wireless communication is provided. The apparatus includes a radio frequency (RF) unit transmitting and/or receiving a radio signal and a processor coupled with the RF unit and configured to receive cyclic shift information indicating a first cyclic shift value, obtain a second cyclic shift value from the first cyclic shift value, transmit a first signal based on the first cyclic shift value through a first antenna, and transmit a second signal based on the second cyclic shift value through a second antenna, wherein the first signal and the second signal are transmitted on the same radio resource.

In still another aspect, a method for transmitting a signal in a wireless communication system using M antennas (M≧2, where M is a natural number), carried in a UE, is provided. The method includes receiving cyclic shift information indicating a first cyclic shift value, generating M cyclic shift values by obtaining M−1 cyclic shift values from the first cyclic shift value, and transmitting each of a plurality of signals to which each of the M cyclic shift values is applied through each of the M antennas, wherein the plurality of signals are transmitted on the same SC-FDMA symbol.

Preferably, the SC-FDMA symbol is divided into a plurality of windows in a time domain, the M cyclic shift values are divided into N groups (N<M, where N is a natural number) without overlapping, and cyclic shift values belonging to different groups among the N groups belong to different windows, and cyclic shift values belonging to the same group among the N groups belong to the same window.

Preferably, a window duration of each of the plurality of windows is determined in accordance with a maximum delay spread.

Preferably, the plurality of signals are for the same data.

ADVANTAGEOUS EFFECTS

A method and an apparatus for transmitting a signal in a wireless communication system are provided.

BRIEF DESCRIPTION OF DRAWINGS

FIG. 12 shows an exemplary structure of an uplink subframe.

FIG. 13 shows an exemplary structure of a reference signal for a physical uplink shared channel (PUSCH) in a radio resource consisting of one subframe in a time domain and one resource block in a frequency domain.

MODE FOR THE INVENTION

Figure 1:
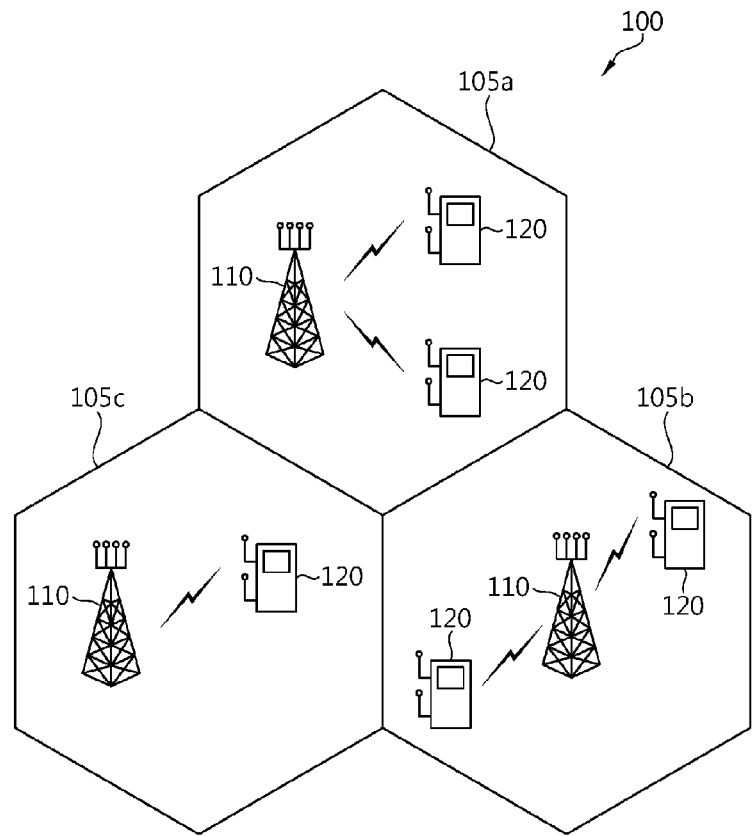
FIG. 1 is a block diagram showing a wireless communication system.

FIG. 1 is a block diagram showing a wireless communication system.

Referring to FIG. 1, a wireless communication system 100 includes at least one base station (BS) 110. The BSs 110 provide communication services with respect to specific geographical regions (generally referred to as cells) 105*a*, 105*b*, and 105*c*. Each cell can be divided into a plurality of regions (referred to as sectors). A user equipment (UE) 120 may be fixed or mobile, and may be referred to as another terminology, such as a mobile station (MS), a user terminal (UT), a subscriber station (SS), a wireless device, etc. The BS 110 is generally a fixed station that communicates with the UE 120 and may be referred to as another terminology, such as an evolved node-B (eNB), a base transceiver system (BTS), an access point, etc.

Hereinafter, downlink means communication from the BS 110 to the UE 120, and uplink means communication from the UE 120 to the BS 110. In downlink, a transmitter may be a part of the BS 110 and a receiver may be a part of the UE 120. In uplink, a transmitter may be a part of the UE 120 and a receiver may be a part of the BS 110.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit (Tx) antennas and a plurality of receive (Rx) antennas.

The MISO system uses a plurality of Tx antennas and one Rx antenna. The SISO system uses one Tx antenna and one Rx antenna. The SIMO system uses one Tx antenna and a plurality of Rx antennas.

Hereinafter, the Tx antenna is a logical or physical antenna used to transmit one signal or one stream, and the Rx antenna is a logical or physical antenna used to receive one signal or one stream.

Figure 2:
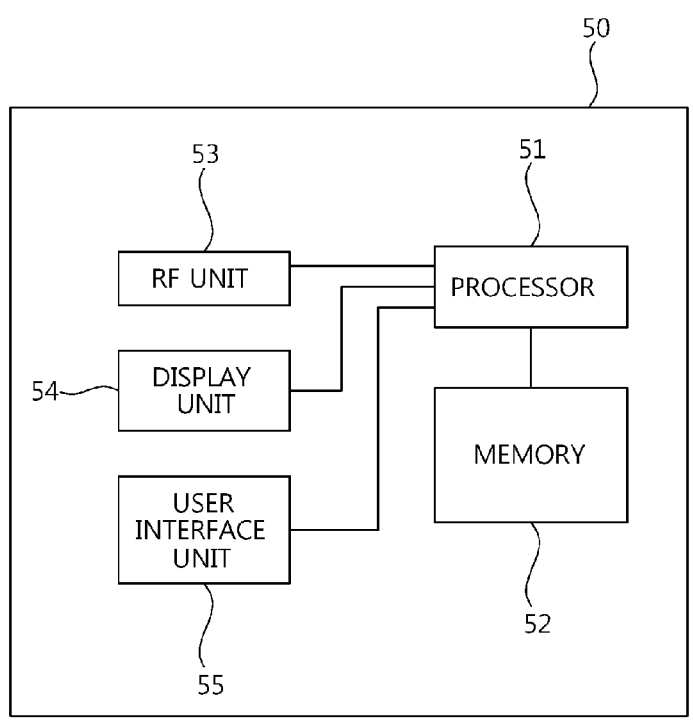
FIG. 2 is a block diagram showing an apparatus for a wireless communication.

FIG. 2 is a block diagram showing an apparatus for a wireless communication. The apparatus may be a part of a UE. An apparatus 50 includes a processor 51, a memory 52, a radio frequency (RF) unit 53, a display unit 54, and a user interface unit 55. The processor 51 may be configured to implement functions, procedures to be proposed below and/or methods described below in this description. The processor 51 may be configured to perform various operations, such as, data processing, generation of a reference signal, MIMO processing, generation of a time-domain signal, etc. The processor 51 may be configured to process a signal according to a method described below and transmits the signal through multiple antennas. Layers of the radio interface protocol may be implemented in the processor 51. The processor 51 may provide the control plane and the user plane. The function of each layer can be implemented in the processor 51. The memory 52 is operatively coupled with the processor 51 and stores a variety of information to operate the processor 51 (e.g., an operating system, applications, and general files). The display unit 54 displays a variety of information of the apparatus 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is operatively coupled with the processor 51 and transmits and/or receives radio signals.

The processor 51 may include application-specific integrated circuit (ASIC), other chipset, logic circuit and/or data processing device. The memories 52 may include read-only memory (ROM), random access memory (RAM), flash memory, memory card, storage medium and/or other storage device. The RF units 53 may include baseband circuitry to process radio frequency signals. When the embodiments are implemented in software, the techniques described herein can be implemented with modules (e.g., procedures, functions, and so on) that perform the functions described herein. The modules can be stored in memories 52 and executed by processor 51. The memories 52 can be implemented within the processor 51 or external to the processor 51 in which case those can be communicatively coupled to the processor 51 via various means as is known in the art.

Figure 3:
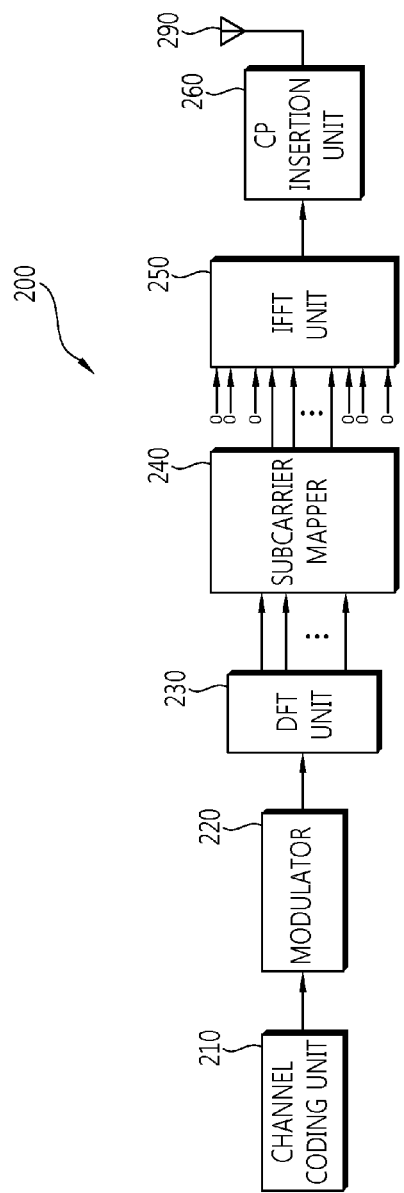
FIG. 3 is a block diagram showing a structure of a transmitter using one transmit (Tx) antenna in a single carrier-frequency division multiple access (SC-FDMA)-based system.

FIG. 3 is a block diagram showing a structure of a transmitter using one Tx antenna in a single carrier-frequency division multiple access (SC-FDMA)-based system.

Referring to FIG. 3, a transmitter 200 includes a channel coding unit 210, a modulator 220, a discrete Fourier transform (DFT) unit 230, a subcarrier mapper 240, an inverse fast Fourier transform (IFFT) unit 250, a cyclic prefix (CP) insertion unit 260, and one Tx antenna 290.

The channel coding unit 210 performs channel coding on a bit stream to generate coded bits. The modulator 220 maps the coded bits to symbols representing a position on a signal constellation. The DFT unit 230 performs DFT on input symbols to output frequency-domain symbols. The subcarrier mapper 240 maps the frequency-domain symbols to respective subcarriers, and properly inserts '0' to the subcarriers. The IFFT unit 250 performs IFFT on input symbols to output a time-domain signal. The CP insertion unit 260 copies an end portion of the time-domain signal and inserts the copied portion into a front portion of the time-domain signal. Inter symbols interference (ISI) and inter carrier interference (ICI) are avoided by the CP insertion, and thus orthogonality can be maintained in a multi-path channel.

Since IFFT is performed after DFT spreading, the SC-FDMA has a single carrier property and has a low PAPR in comparison with orthogonal frequency division multiplexing (OFDM). Therefore, it is possible to allow a UE having limited power to use higher Tx power. Accordingly, a user throughput can be increased.

Figure 4:
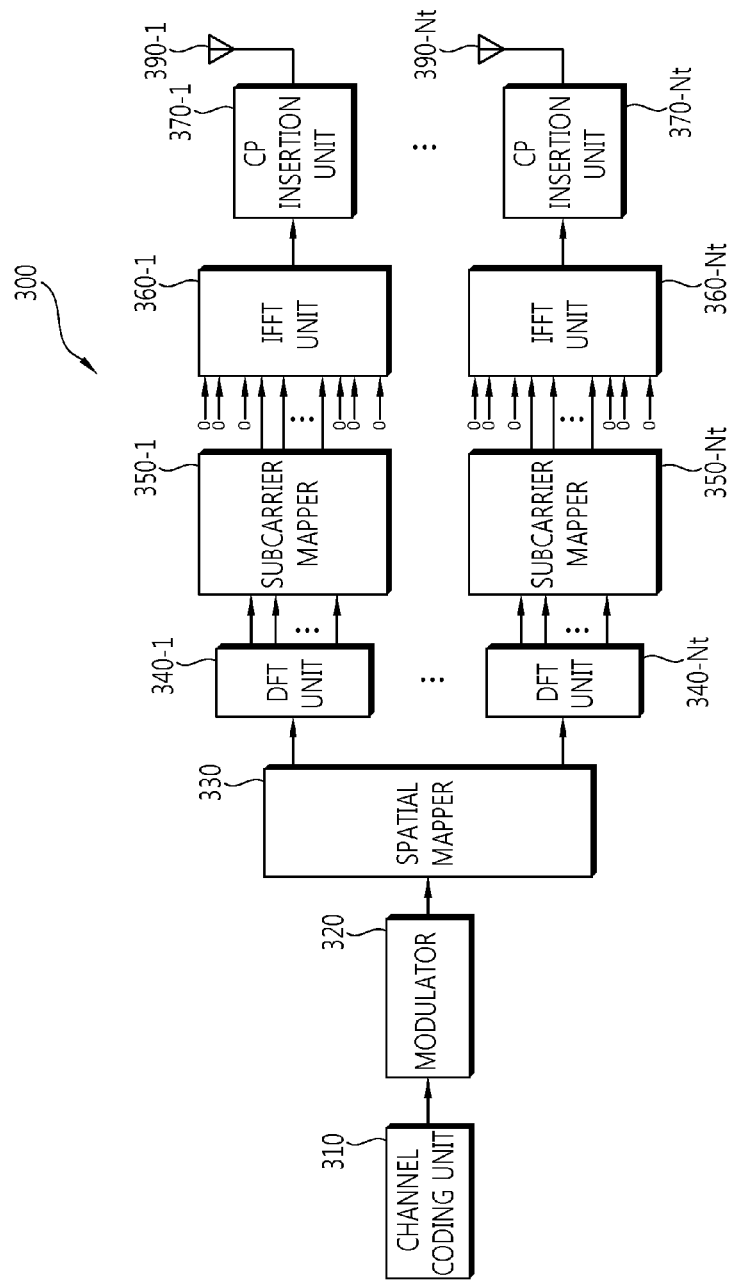
FIG. 4 is a block diagram showing an exemplary structure of a transmitter using a plurality of Tx antennas in an SC-FDMA-based system.

FIG. 4 is a block diagram showing an exemplary structure of a transmitter using a plurality of Tx antennas in an SC-FDMA-based system.

Referring to FIG. 4, a transmitter 300 includes a channel coding unit 310, a modulator 320, a spatial mapper 330, DFT units 340-1, . . . , 340-Nt, subcarrier mappers 350-1, . . . , 350-Nt, IFFT units 360-1, . . . , 360-Nt, CP insertion units 370-1, . . . , 370-Nt, and a plurality of Tx antennas 390-1, . . . , 390-Nt. The transmitter 300 is a single-codeword system having one channel coding unit 310 and one modulator 320. The spatial mapper 330 performs spatial multiplexing on symbols according to a spatial multiplexing rate. The spatial-multiplexed symbols of each space are transmitted respectively through the Tx antennas 390-1, . . . , 390-Nt via the DFT units 340-1, . . . , 340-Nt, the subcarrier mappers 350-1, . . . , 350-Nt, the IFFT units 360-1, . . . , 360-Nt, and the CP insertion units 370-1, . . . , 370-Nt. The transmitter 300 can obtain a maximum coding gain if the spatial multiplexing rate increases. However, channel adaptive resource allocation for each space may not be flexibly achieved.

Figure 5:
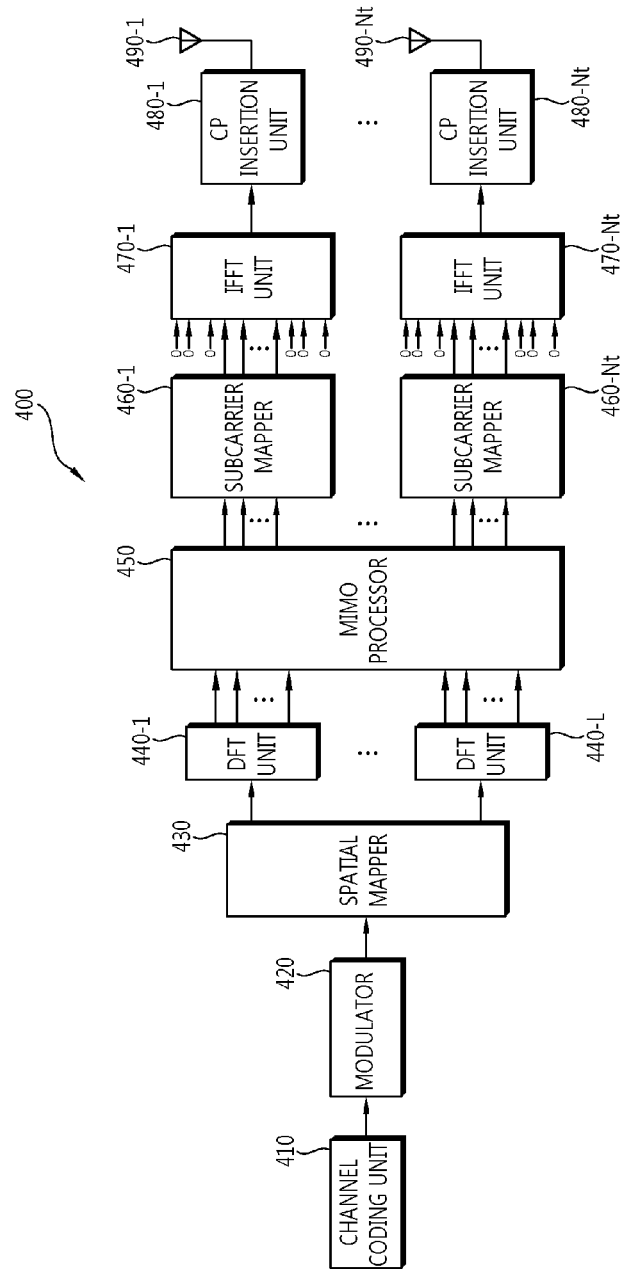
FIG. 5 is a block diagram showing another exemplary structure of a transmitter using a plurality of Tx antennas in an SC-FDMA-based system.

FIG. 5 is a block diagram showing another exemplary structure of a transmitter using a plurality of Tx antennas in an SC-FDMA-based system.

Referring to FIG. 5, a transmitter 400 includes a channel coding unit 410, a modulator 420, a spatial mapper 430, DFT units 440-1, . . . , 440-L, a MIMO processor 450, subcarrier mappers 460-1, . . . , 460-Nt, IFFT units 470-1, . . . , 470-Nt, CP insertion units 480-1, . . . , 480-Nt, and a plurality of Tx antennas 490-1, . . . , 490-Nt. The transmitter 400 is a single-codeword system. Spatial-multiplexed symbols for each space are processed respectively by the DFT units 440-1, . . . , 440-L, and then are subjected to MIMO processing by the MIMO processor 450 according to a multiple antenna scheme. For example, the MIMO processing includes a Tx antenna scheme such as space-time block coding (STBC), cyclic delay diversity (CDD), precoding, beamforming, etc. The transmitter 400 can perform channel adaptive resource allocation for each space in a flexible manner.

Figure 6:
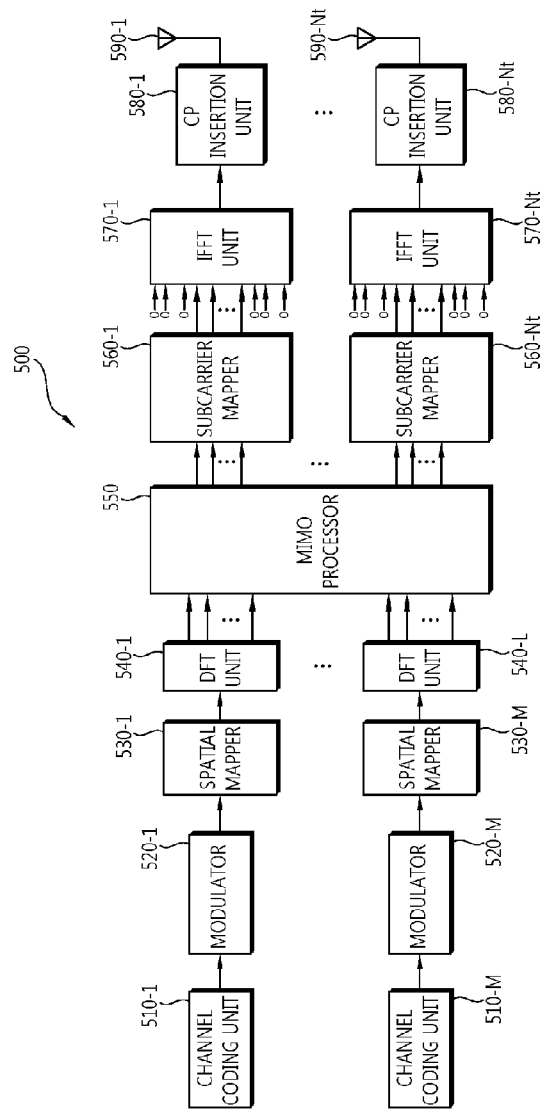
FIG. 6 is a block diagram showing another exemplary structure of a transmitter using a plurality of Tx antennas in an SC-FDMA-based system.

FIG. 6 is a block diagram showing another exemplary structure of a transmitter using a plurality of Tx antennas in an SC-FDMA-based system.

Referring to FIG. 6, a transmitter 500 includes channel coding units 510-1, . . . , 510-M, modulators 520-1, . . . , 520-M, spatial mappers 530-1, . . . , 530-M, DFT units 540-1, . . . , 540-L, a MIMO processor 550, subcarrier mappers 560-1, . . . , 560-Nt, IFFT units 570-1, . . . , 570-Nt, CP insertion units 580-1, . . . , 580-Nt, and a plurality of Tx antennas 590-1, . . . , 590-Nt. The transmitter 500 is a multiple-codeword system having M channel coding units 510-1, . . . , 510-M and M modulators 520-1, . . . , 520-M. Modulation may be performed for each codeword. Modulation symbols for the respective codewords are spatial-multiplexed by the spatial mappers 530-1, . . . , 530-M. The number M of the codewords may be identical to a spatial multiplexing rate or may be less than the spatial multiplexing rate. The transmitter 500 is the same as the transmitter 400 of FIG. 5 except that the transmitter 500 is the multiple-codeword system.

Hereinafter, STBC, CDD, and precoding which can be performed by the MIMO processor of FIG. 5 and FIG. 6 according to a multiple antenna scheme will be described.

First, STBC will be described.

The STBC is a scheme in which the same signal is repetitively transmitted through different Tx antennas while the signal is continuously transmitted in a time domain or a frequency domain in a multiple antenna environment. A spatial diversity gain can be obtained using the STBC.

The following equation shows an example of STBC for a transmitter using two Tx antennas.

MathFigure 1

$$\frac{1}{\sqrt{2}} \begin{bmatrix} S_1 & -S_2^* \\ S_2 & S_1^* \end{bmatrix} \qquad \text{[Math. 1]}$$

Herein, S1 and S2 denote Tx symbols, and (•)* denotes a complex conjugate of (•). A row and/or column of a matrix may correspond to a Tx antenna, a time, a frequency, etc. For example, each row of the matrix may correspond to each Tx antenna, and each column of the matrix may correspond to a time or a frequency. If orthogonality is maintained between rows, a symbol location can be changed freely.

The STBC for the two Tx antennas can be extended to be used for four Tx antennas.

The following equation shows an example of STBC for a transmitter using four Tx antennas.

MathFigure 2

$$\frac{1}{\sqrt{2}} \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix} \qquad \text{[Math. 2]}$$

Herein, Tx symbols are simply repeated in the time domain or the frequency domain.

Second, CDD will be described.

Figure 7:
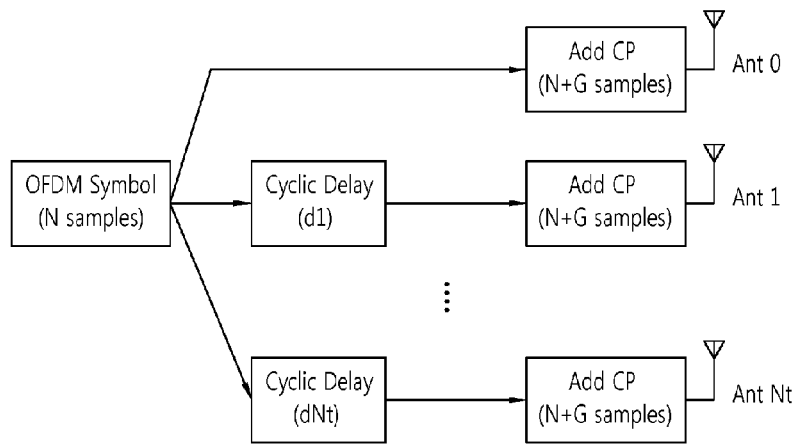
FIG. 7 shows an example of cyclic delay diversity (CDD) in a time domain.

FIG. 7 shows an example of CDD in a time domain.

Referring to FIG. 7, a spatial multiplexing rate is 1. A signal in which an OFDM symbol is added with a CP is transmitted through an Ant 0 (herein and hereinafter an antenna n is simply referred to as an Ant n). A signal in which the OFDM symbol is cyclic-delayed by d1 and is then added with a CP is transmitted through an Ant 1. A signal in which the OFDM symbol is cyclic-delayed by dNt and is then added with a CP is transmitted through an Ant Nt. Herein, the OFDM symbol corresponds to N samples, and the CP corresponds to G samples.

As such, the CDD is a scheme in which an OFDM symbol is transmitted with a different cyclic delay or a different size for each Tx antenna in a system having a plurality of Tx antennas. Since a frequency diversity gain can be obtained in a channel decoding process of a receiver, complexity of the receiver can be significantly decreased.

A cyclic delay of an OFDM symbol in the time domain is equivalent to an OFDM symbol multiplied by a phase sequence in a frequency domain.

Figure 8:
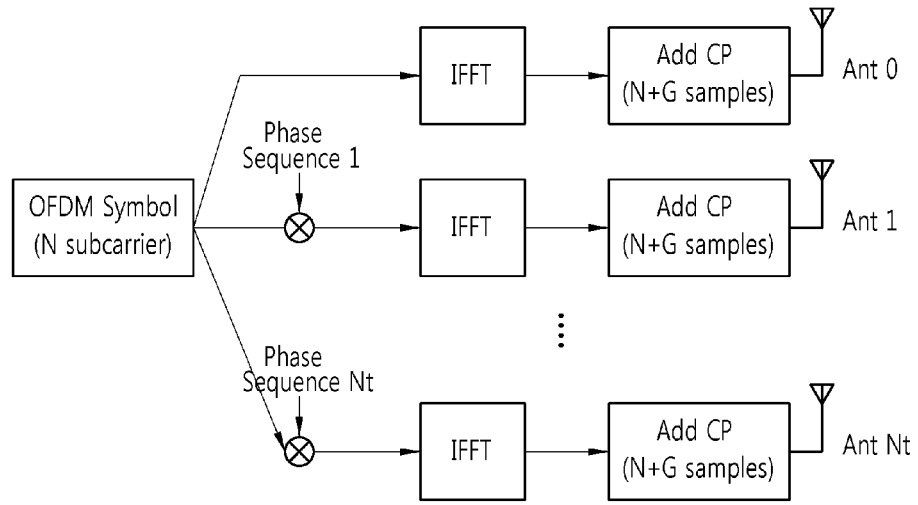
FIG. 8 shows an example of CDD in a frequency domain.

FIG. 8 shows an example of CDD in a frequency domain.

Referring to FIG. 8, a signal in which a frequency-domain OFDM symbol is subjected to IFFT and is then added with a CP is transmitted through an Ant 0. A signal in which the frequency-domain OFDM symbol is multiplied by a phase sequence 1, is then subjected to IFFT, and is then added with a CP is transmitted through an Ant 1. A signal in which the frequency-domain OFDM symbol is multiplied by a phase sequence Nt, is then subjected to IFFT, and is then added with a CP is transmitted through an Ant Nt. Herein, the frequency-domain OFDM symbol corresponds to N subcarriers, and the CP corresponds to G samples.

As such, the CDD in the frequency domain is a scheme for transmitting a signal multiplied by each different phase sequence in the frequency domain for each Tx antenna before the IFFT is performed. This is referred to as phase shift diversity (PSD). The PSD can be used not only in an OFDM system but also in an SC-FDMA system.

Third, precoding is described.

The precoding is a scheme in which a transmitter transmits a Tx signal to which a precoding matrix is applied. The transmitter applies the precoding matrix by using feedback information received from a receiver. The feedback information may be quantized channel information. If using codebook-based precoding, the feedback information may be an index of a precoding matrix.

Figure 9:
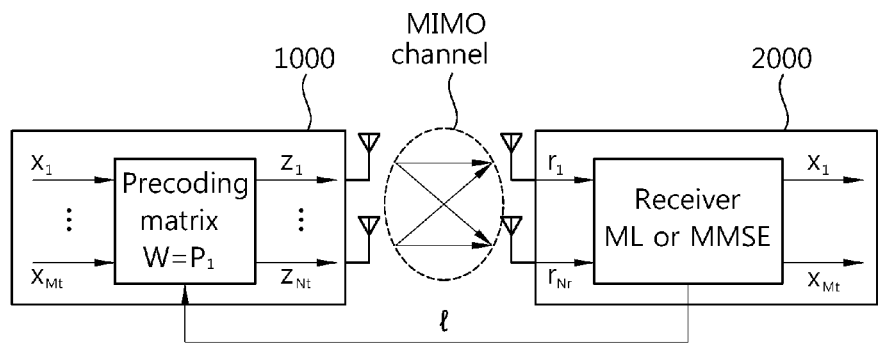
FIG. 9 shows an example of codebook-based precoding.

FIG. 9 shows an example of codebook-based precoding.

Referring to FIG. 9, a transmitter 1000 receives an index l of a precoding matrix from a receiver 2000 as feedback information (where, l∈{1, ..., L}). It is assumed that the transmitter 1000 and the receiver 2000 have a finite number L of precoding matrixes. The L precoding matrixes are referred to as a codebook. The transmitter 1000 selects a precoding matrix W (where W=P$_l$) from the codebook according to the feedback information. The transmitter 1000 outputs Tx signals $z_1, \ldots, z_{Nt}$ by processing Tx symbols $x_1, \ldots, x_{Mt}$ with the precoding matrix. The transmitter 1000 transmits the Tx signals $z_1, \ldots, z_{Nt}$ through Nt Tx antennas. A MIMO channel is established between the transmitter 1000 and the receiver 2000. The receiver 2000 receives Rx signals $r_1, \ldots, r_{Nr}$ through Nr Rx antennas. The receiver 2000 estimates a Tx symbol from an Rx symbol by using a maximum likelihood (ML) receiver or a minimum mean square error (MMSE) receiver.

Phase shift-based precoding (PSP) is a scheme in which precoding and CDD is combined.

The following equation shows an example of a PSP matrix PSP(k).

MathFigure 3

$$PSP(k) = B(k)U \qquad \text{[Math. 3]}$$

$$= \begin{bmatrix} e^{j\theta_1 k} & 0 & \ldots & 0 \\ 0 & e^{j\theta_2 k} & \ldots & 0 \\ \ldots & \ldots & \ddots & \ldots \\ 0 & 0 & \ldots & e^{j\theta_{Nt} k} \end{bmatrix} U$$

Herein, B(k) denotes a phase shift matrix having a size of Nt×Nt, and U denotes a precoding matrix having a size of Nt×R. The phase shift matrix B(k) shifts a phase of the precoding matrix U according to k. k may be an index of a subcarrier or an index of a virtual resource. Alternatively, k may be indices of a plurality of subcarriers or an index of a virtual resource group. The precoding matrix U can be configured to include CDD. In addition, the PSP matrix PSP(k) may be configured with several combinations of a plurality of phase shift matrixes and a plurality of precoding matrixes.

The multiple antenna system scheme described above is optimized for an orthogonal frequency division multiple access (OFDMA) system. Since an SC-FDMA property may change if the SC-FDMA system uses the multiple antenna scheme, there is a need to design a multiple antenna scheme optimized for SC-FDMA.

The SC-FDMA-based multiple antenna system is preferably compatible with a long term evolution (LTE) system. Thus, a frame structure of the LTE system disclosed in sections 4 and 5 of the 3GPP TS 36.211 V8.2.0 (2008-March) "Technical Specification Group Radio Access Network; Evolved Universal Terrestrial Radio Access (E-UTRA); Physical Channels and Modulation (Release 8)" will be described.

Figure 10:
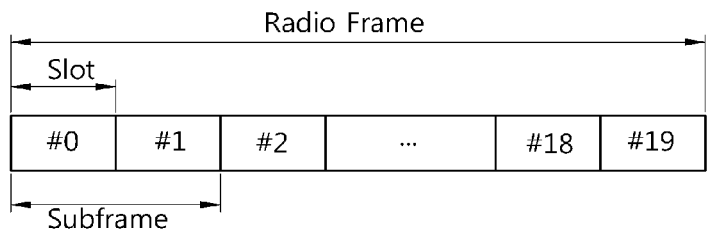
FIG. 10 shows a structure of a radio frame.

FIG. 10 shows a structure of a radio frame.

Referring to FIG. 10, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is shown for exemplary purposes only. Thus, the number of subframes included in the radio frame or the number of slots included in the subframe may change variously.

Figure 11:
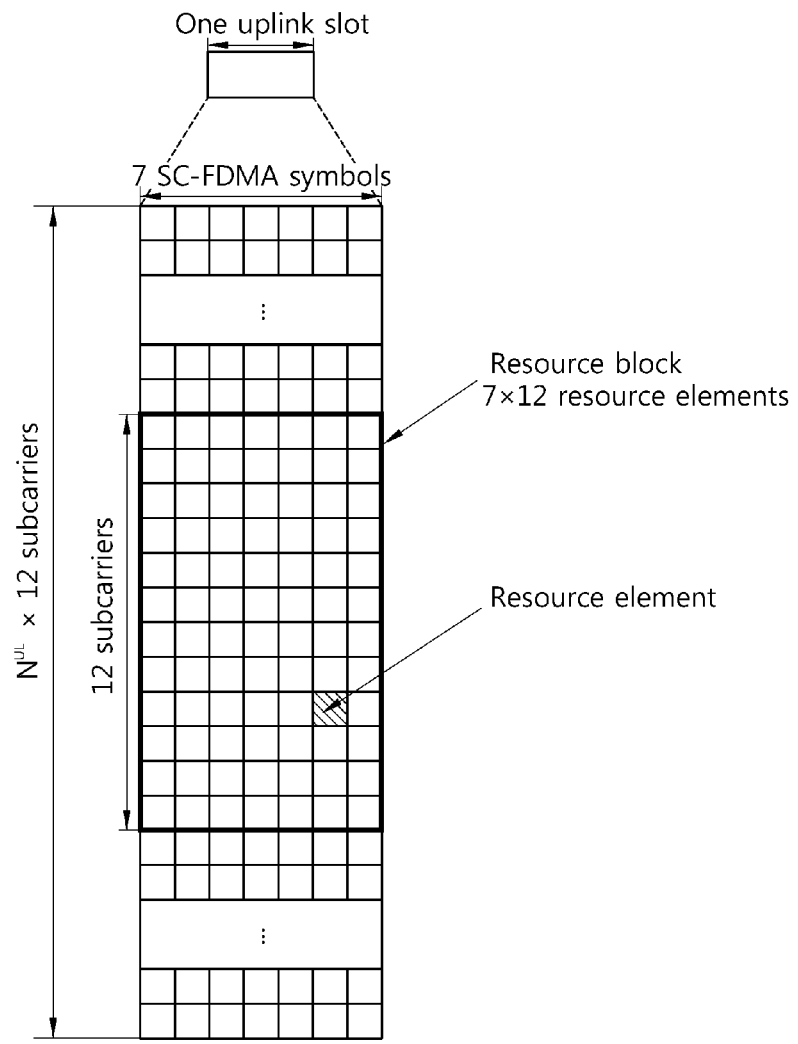
FIG. 11 shows an example of a resource grid for one uplink slot.

FIG. 11 shows an example of a resource grid for one uplink slot.

Referring to FIG. 11, the uplink slot includes a plurality of SC-FDMA symbols in a time domain and $N^{UL}$ resource blocks (RBs) in a frequency domain. The SC-FDMA symbol is for expressing one symbol period, and may be referred to as an OFDMA symbol or a symbol duration according to a system. The RB is a resource allocation unit and includes a plurality of subcarriers in the frequency domain. The number $N^{UL}$ of RBs included in the uplink slot depends on an uplink transmission bandwidth configured in a cell. Each element on the resource grid is referred to as a resource element. Although it is described herein that one RB includes 7×12 resource elements consisting of 7 SC-FDMA symbols in the time domain and 12 subcarriers in the frequency domain, this is for exemplary purposes only. Thus, the number of SC-FDMA symbols and the number of subcarriers in the RB are not limited thereto. The number of SC-FDMA symbols may change according to a length of a CP. For example, if a normal CP is used, the number of OFDM symbols is 7, and if an extended CP is used, the number of OFDM symbols is 6.

The resource grid for one uplink slot of FIG. 11 can also apply to a resource grid for a downlink slot. In this case, however, the downlink slot includes a plurality of OFDM symbols in the time domain.

FIG. 12 shows an exemplary structure of an uplink subframe.

Referring to FIG. 12, the uplink subframe may be divided into a control region allocated to a physical uplink control channel (PUCCH) carrying uplink control information and a data region allocated to a physical uplink shared channel (PUSCH) carrying user data. A middle portion of the subframe is allocated to the PUSCH, and both end portions of the data region is allocated to the PUCCH. To maintain a single carrier property in SC-FDMA, consecutive RBs in a frequency domain are allocated to one UE. One UE cannot simultaneously transmit the PUCCH and the PUSCH.

The PUCCH for one UE is allocated to an RB pair in a subframe. RBs belonging to the RB pair occupy different subcarriers in each of the two slots. In this case, it is said that the RB pair allocated to the PUCCH is subject to frequency hopping at a slot boundary. In FIG. 12, m denotes a location index indicating a frequency domain location of an RB pair allocated to the PUCCH in the subframe.

Examples of an uplink control signal transmitted on the PUCCH include an hybrid automatic repeat request (HARM) acknowledgment (ACK)/negative-acknowledgment (NACK), a channel quality indicator (CQI) indicating a downlink channel condition, a scheduling request signal that is an uplink radio resource allocation request, etc. The uplink control information can be transmitted on not only the PUCCH but also the PUSCH.

The PUSCH is mapped to an uplink shared channel (UL-SCH) that is a transport channel, and carries a data stream and/or uplink control information.

FIG. 13 shows an exemplary structure of a reference signal for a PUSCH in a radio resource consisting of one subframe in a time domain and one resource block in a frequency domain.

Referring to FIG. 13, the reference signal for the PUSCH is transmitted in a 4th SC-FDMA symbol (i.e., an SC-FDMA symbol located in the center of a slot) for each of two slots in a subframe. For channel estimation, the reference signal needs to be known to both a transmitter and a receiver. To maintain a single carrier property, entire sub-carriers of one SC-FDMA symbol is used for transmission of the reference signal. The reference signal for the PUSCH is a demodulation reference signal (DMRS) which is used for channel estimation to demodulate data transmitted on the PUSCH.

The reference signal may be generated by being multiplied by a predefined reference signal sequence. The reference signal sequence may be a binary sequence or a complex sequence. For example, the reference signal sequence may be a Zadoff-Chu (ZC) sequence.

The same resource block may be assigned to a plurality of UEs. In this case, data of each of the plurality of UEs can be recovered only if a BS can identify a reference signal for each UE. To identify the reference signal for each UE, the reference signal may be transmitted by using a different reference signal sequence for each UE. Preferably, reference signal sequences for the respective UEs are orthogonal to each other or have a low correlation with each other. For example, the reference signal sequence for each UE may be a sequence in which a first sequence is cyclic-shifted with a different cyclic shift (CS) amount in the time domain according to a UE. If CS is applied in the time domain, the reference signal may have a configuration in which the first sequence is multiplied by a phase shift sequence in the frequency domain.

If $S^{(a)}(n)$ denotes a sequence generated by cyclically shifting the first sequence by a CS amount 'a', $S^{(a)}(n)$ can be expressed by the following equation.

Math Figure 4

$$S^{(a)}(n)=e^{jan}S(n) \qquad \text{[Math. 4]}$$

Herein, $n=0, 1, \ldots, M^{RS}-1$ and $a=2\pi n_{CS}/12$. $S(n)$ denotes a first sequence with a length of $M^{RS}$. For example, MRS denotes the number of subcarriers corresponding to a bandwidth scheduled for uplink transmission. Hereinafter, $n_{CS}$ is referred to as a CS factor. The CS factor indicates a CS amount. The CS amount is a standard of CS in frequency domain.

By applying the different CS amount 'a' to each UE, the BS can identify the reference signal for each UE even if the same resource block is allocated to a plurality of UEs. Therefore, the same resource block can be allocated simultaneously to multiple users or multiple pieces of data in accordance with the number of CS factors. If one resource block consists of 12 subcarriers, up to 12 CS factors can be configured ($n_{CS}$=0, 1, . . . 11). Although up to 12 CS factors are possible, performance of wireless communication can be maintained to the highest level by using only CS factors having good correlation properties. For example, 8 CS factors having good correlation properties can be used. In this case, up to 8 UEs or 8 independent pieces of data can be assigned to the same time-frequency radio resource.

The BS can assign the CS factor $n_{CS}$ in accordance with each UE in a cell. If using the 8 CSs, the BS can transmit information regarding the CS factor to the each UE by using a 3-bit CS field. The following table shows an example of the 3-bit CS field.

TABLE 1

| Cyclic Shift Field | $n_{CS}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

The CS field can be transmitted by being included in control information which regards uplink resource allocation on a physical downlink control channel (PDCCH). The control information transmitted on the PDCCH is referred to as downlink control information (DCI). For example, the control information regarding uplink resource allocation may use a DCI format 0 for PUSCH scheduling. The UE transmits a reference signal to which a CS is applied according to the CS field.

The CS factor $n_{CS}$ may be determined by combining other parameters in addition to the CS field. For example, the UE can determine the CS factor according to the CS field, a value to be broadcast, a cell identifier (ID), etc.

Figure 14:
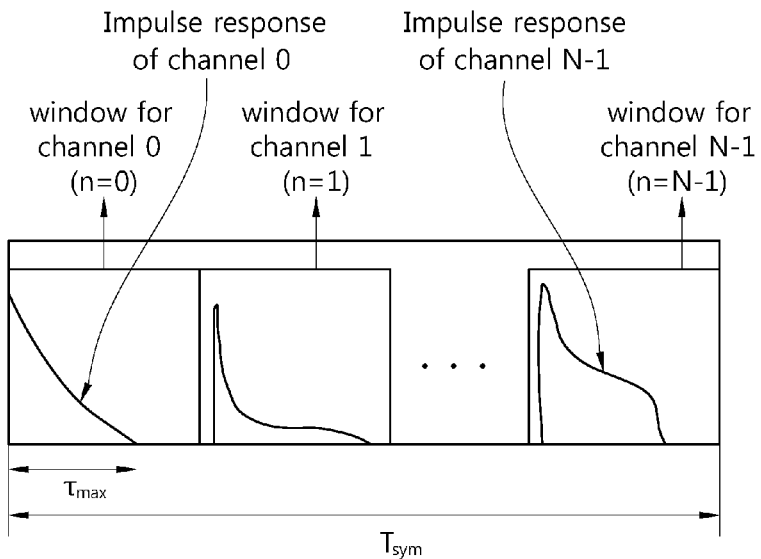
FIG. 14 shows an example of an impulse response in a time domain if a plurality of user equipments transmit respective reference signals.

FIG. 14 shows an example of an impulse response in a time domain if a plurality of UEs transmit respective reference signals. In this case, the plurality of UEs transmit the respective reference signals by using the same time-frequency radio resource.

Referring to FIG. 14, impulse responses of channels 0 to N−1 are identified in one SC-FDMA symbol duration $T_{sym}$. A channel n denotes a channel of a UE using a CS in accordance with n (0≦n≦N−1, where n and N are integers). Herein, n denotes a CS index, where n=0, . . . , N−1. Therefore, a BS can estimate each channel through time-domain windowing. The time-domain windowing corresponds to frequency-domain filtering. The channel n can be estimated through a window n. The time-domain windowing can be performed using a window function. For example, the window function may be a function that returns 1 only in a window duration and returns 0 in the remaining durations other than the window duration. The window duration may be determined according to a maximum delay spread of a channel.

As such, to identify an impulse response of a channel for each UE, CSs used by the respective UEs must have sufficient intervals. The maximum number of CSs for identifying the impulse response of each channel is determined according to the maximum delay spread of the channel.

The following equation shows the maximum number N of the CSs.

MathFigure 5

$$N = \left\lfloor \frac{T_{sym}}{\tau_{max}} \right\rfloor \quad \text{[Math. 5]}$$

Herein, $T_{sym}$ denotes a length of an OFDM symbol or SC-FDMA symbol, and $\tau_{max}$ denotes a maximum delay spread of a channel. Hereinafter, n denotes a CS index, where n=0, . . . , N−1.

In an OFDM system or SC-FDMA system, one OFDM symbol or one SC-FDMA symbol have a length of $T_{sym}$=1/Δf, where Δf is a subcarrier spacing.

A CS value indicated by CS index n can be expressed by n×$\Delta_{cs}$. The CS value is a standard of CS in time domain. $\Delta_{cs}$ can be expressed by the following equation.

MathFigure 6

$$\Delta_{cs} \approx \frac{T_{sym}}{N} \quad \text{[Math. 6]}$$

If a different CS index n is used for each UE, the BS can identify each channel through windowing. As such, the number of pieces of data or the number of users that can be multiplexed at the same time by using the same time-frequency radio resource are limited depending on the maximum number of CSs. However, according to a cell size or a surrounding environment, an actual maximum delay spread of a channel may be different from a maximum delay spread $\tau_{max}$ used to calculate the maximum number of CSs. In particular, since a wireless communication system is a time variant system, a transmission environment may change over time. If the actual maximum delay spread is greater than the maximum delay spread $\tau_{max}$, interference may occur between channels using consecutive CS indices n.

Now, a method for transmitting a signal in an SC-FDMA-based multiple antenna system will be described. The signal is for data and/or a DMRS. The same time-frequency radio resource can be allocated simultaneously to a plurality of UEs, and each UE can have a plurality of antennas.

If the UE transmits uplink signals by using the plurality of antennas, there is one resource grid defined per antenna. That is, a DMRS and data can be transmitted through the time-frequency radio resource as shown in FIG. 13 for each antenna. Therefore, it is necessary to identify a channel for each antenna. In a multiple antenna scheme such as STBC, channels for respective antennas have to be separated each other as much as possible without interference between the channels for the respective antennas. For this, a channel for each antenna can be identified in such a manner that one UE applies a different CS value to each antenna. The maximum number of CSs is limited according to the maximum delay spread, and thus it is important to properly use a CS value for each antenna in accordance with the multiple antenna scheme.

Figure 15:
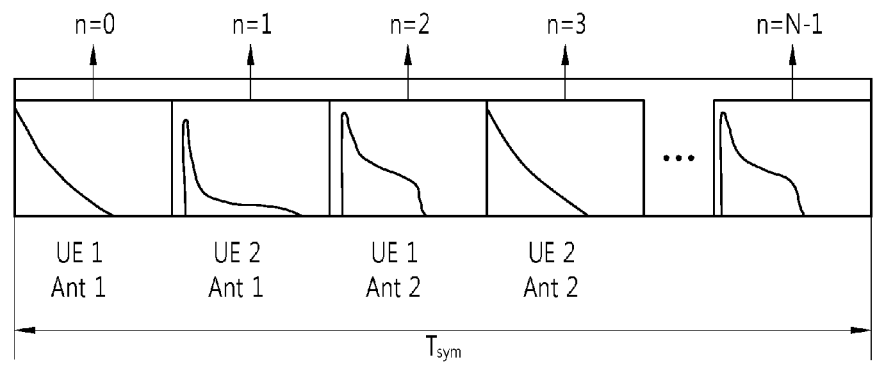
FIG. 15 shows an example of a channel impulse response in a time domain if UEs, each of which uses a plurality of antennas, transmit each of a plurality of signals.

FIG. 15 shows an example of a channel impulse response in a time domain if UEs, each of which uses a plurality of antennas, transmit each of a plurality of signals. In this case, the UEs, each of which uses the plurality of antennas, transmit the each of the plurality of signals by applying different CS values through the same time-frequency radio resource.

Referring to FIG. 15, regarding a UE 1, a CS index n is 0 for an Ant 1 and is 2 for an Ant 2. Regarding a UE 2, the CS index n is 1 for an Ant 1 and is 3 for an Ant 2. In one UE, CS indices for the respective antennas are assigned to have a difference of 2. Since interference may occur between consecutive CS indices, it is preferable that the CS indices of the respective antennas have a difference of at least 2.

A plurality of CS values can be assigned to one UE according to various methods. Hereinafter, a method for assigning a plurality of CS values to one UE will be described.

(1) A Method for Assigning Multiple CS Values

In this method, a BS transmits CS values for respective antennas to a UE. The CS values for the respective antennas can be transmitted through CS fields each having the same bit size. Alternatively, an offset may be predefined, and the CS values for the respective antennas may be transmitted through one CS field and an offset field. The CS values may be transmitted through a PDCCH by being included in a DCI format for uplink resource allocation. This method provides a high degree of freedom since the BS can properly assign CS values of which number is limited according to a cell condition and a channel condition.

(2) A Predefined Method

In this method, a BS transmits a CS value for only one antenna to a UE. The UE uses the received CS value as a reference CS value and determines other CS values in accordance with a predetermined offset. The offset may be one predetermined value, or may be a value determined by a specific pattern according to a time-frequency radio resource. The offset may be used differently from one BS to another. Information regarding the offset may be semi-statically transmitted through high-layer signaling. Alternatively, the information regarding the offset may be cell-specific information and may be transmitted through a broadcast channel. With this method, an overhead of control information transmission can be reduced in comparison with the method for assigning multiple CS values.

In this case, a CS value for each antenna can be predefined to be a maximum distance by considering interference between antennas. If N denotes the maximum number of available CSs and Nt denotes the number of antennas that can be used by a UE for transmission of signals, an offset may be N/Nt, ceil(N/Nt), or floor(N/Nt). Herein, ceil(•) is a function that returns the smallest integer value greater than or equal to (•), and floor(•) is a function that returns the greatest integer less than or equal to (•).

For example, it is assumed that a CS index 0 of a reference CS value is assigned to a UE using two antennas. The UE may use a CS index of 0 for an Ant 1, and may use a CS index of N/2, ceil(N/2), or floor(N/2) for an Ant 2. That is, an offset is set to N/2, ceil(N/2), or floor(N/2) from a CS index of a reference CS value so that the distance between CS indices of the respective antennas is maximum. It is assumed that the CS index of the reference CS value is 0 if it is assigned to a UE using four antennas. For convenience of explanation, N is assumed to be a multiple of 4. The UE can use a CS index of 0 for an Ant 1, a CS index of N/4 for an Ant 2, a CS index of 2N/4 for an Ant 3, and a CS index of 3N/4 for an Ant 4.

(3) A Method for Applying a Small CS in a Multiple Antenna System

Figure 16:
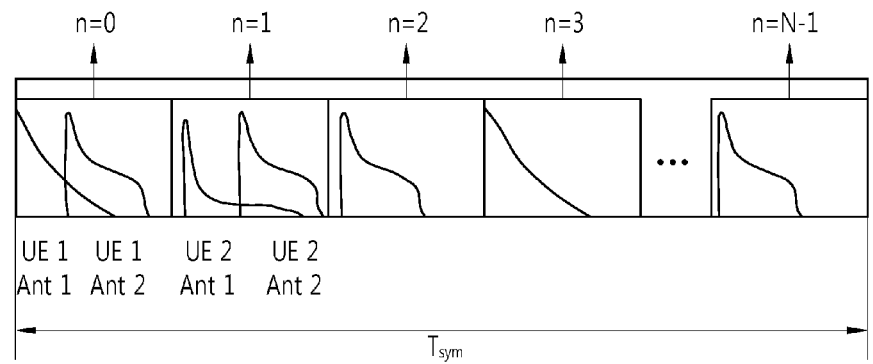
FIG. 16 shows an example of a method for applying a small cyclic shift in a wireless communication system.

FIG. 16 shows an example of a method for applying a small CS in a multiple antenna system.

Referring to FIG. 16, regarding a UE 1, a CS index n is 0. Regarding a UE 2, the CS index n is 1. In the UE 1, a CS value for an Ant 1 and a CS value for an Ant 2 are located in one inner window. In the UE 2, a CS value for an Ant 1 and a CS value for an Ant 2 are also located in one inner window.

To minimize inter-cell interference, a BS assigns only one CS value to one UE. Hereinafter, one CS value assigned to the UE is referred to as a reference CS value. The UE configures CS values for a plurality of antennas such that the respective CS values are located in one inner window according to a reference CS value. Therefore, the CS values for the respective antennas are values within a range less than a maximum delay spread $\tau_{max}$ with respect to the reference CS value. That is, a difference between two different CS values out of the CS values for a UE is less than a maximum delay spread. A CS in the range less than the maximum delay spread $\tau_{max}$ is referred to as the small CS. If the small CS is applied, CSs values for the respective antennas belong to the same window. Therefore, channels for the respective antennas of the UE can be included in one inner window. Hereinafter, a CS in the range greater than the maximum delay spread $\tau_{max}$ as shown in FIG. 15 is referred to as a large CS in order to be distinguished from the small CS. If the large CS is applied, the CS values for the respective antennas of the UE belong to different windows. That is, a difference between two different CS values out of the CS values for a UE is greater than a maximum delay spread.

For example, it is assumed that a UE has two antennas. A reference CS value is applied to a CS value for an Ant 1. A CS value for an Ant 2 is preferable selected from a range less than $\tau_{max}/2$ with respect to the reference CS value.

Among multiple antenna schemes, the method for applying the small CS is suitable for a system using a multiple antenna scheme capable of receiving data without having to perform channel estimation for each Tx antenna. Examples of the method include CDD, PSD, precoding, etc.

In case of the precoding, the same CS value is identically applied for each Tx antenna if a dedicated reference signal is used. If the same precoding matrix is applied to a demodulation reference signal (DMRS), data reception is possible since a receiver can obtain an equivalent channel to which the precoding is applied. Therefore, the small CS can be applied for each Tx antenna.

(4) A Method for Applying a Hybrid CS in a Multiple Antenna System

The method for applying the hybrid CS uses both the large CS and the small CS in combination with each other. The method for applying the small CS or the method for applying the hybrid CS is for the effective use of the maximum number of limited CSs. With this method, a proper number of CSs can be maintained for other users.

For example, it is assumed that a UE uses four antennas. The four antennas are paired by two antennas and thus are grouped into two antenna groups. The large CS is applied to each antenna group. The small CS is applied between antennas in each antenna group. Therefore, a channel for another antenna group can be included in an outer window, and a channel for each antenna in the same antenna group can be included in one inner window. In this case, although the UE uses the four antennas, only two CS values can be assigned for transmission of signals. A BS receives the signals in the same manner in which the UE transmits data through two antennas. Accordingly, it is required to use a multiple antenna scheme for two antennas instead of using a multiple antenna scheme for four antennas.

A general case where a UE uses M antennas (M≧2, where M is a natural number) will be described. The M antennas are divided into N antenna groups (N<M, where N is a natural number) without overlapping. The large CS is applied between different antenna groups, and the small CS is applied in the same antenna group. Accordingly, CS values belonging to different antenna groups among the N antenna groups belong to different windows. In addition, CS values belonging to the same antenna group among the N antenna groups belong to the same window.

(5) A Method for Applying a Fixed CS in a Multiple Antenna System

Each antenna's CS value used for a PUSCH and a reference signal used to transmit CDD of data will be described. A difference between a reference CS value assigned to one UE and a CS value applied to each antenna is one or several samples of a sampling frequency corresponding to a Tx bandwidth.

For example, it is assumed that a CS index 0 is assigned as a reference CS value to a UE using two antennas. Transmission is made through an Ant 1 with a=0 and is made through an Ant 2 with a=$2\pi n'/N_{fft}$. Herein, 'a' denotes CS amount. The CS amount is also referred to as a phase component of a CS or phase shift. Nfft denotes a fast Fourier transform (FFT) size applied to the Tx bandwidth, and n'=0, 1, . . . , $N_{fft}$−1. Nfft can be expressed by the following equation.

MathFigure 7

$$N_{fft} = \frac{1}{\Delta f \cdot Ts} \qquad \text{[Math. 7]}$$

Herein, Δf denotes a subcarrier spacing, and Ts denotes a sampling time corresponding to a Tx bandwidth.

A case where n'=1, that is, a case where a CS corresponding to one sample is applied will be described. For example, it is assumed that the Tx bandwidth is 20 MHz, and Δf=15 kHz, $N_{fft}$=2048, and Ts=1/(Δf×$N_{fft}$)=32.552 ns. Then, transmission is made through an Ant 1 with a=0 and is made through an Ant 2 with a=$2\pi \times 1/2048$. For another example, it is assumed that the Tx bandwidth is 1.4 MHz, and Δf=15 kHz, $N_{fft}$=128, and Ts=1/(Δf×$N_{fft}$)=520.83 ns. Then, transmission is made through an Ant 1 with a=0 and is made through an Ant 2 with a=$2\pi \times 1/128$.

(6) A Method for Configuring a Data Channel

A CS for each antenna can be applied differently to a DMRS and data. In case of STBC, it is preferable that the CS for each antenna is applied only to the DMRS and is not applied to the data. In case of CDD, PSD, or precoding, the CS for each antenna can be applied to both the DMRS and the data or can be applied only to the DMRS. System performance may be almost similar in the both cases. However, in case of the method for applying the small CS, the CS for each antenna is applied to both the DMRS and the data.

(7) A Method for Applying a Multiple Antenna Scheme in a Multiple RF System.

A UE can use the multiple RF system. The multiple RF system is a system in which a plurality of physical channels are allocated to one UE. In this case, different CS values can be assigned for respective physical channels. In this case, although a different CS value is assigned to each physical channel, an offset may be configured to be identical for all physical channels in one UE. Accordingly, an overhead of control information can be reduced. The offset may be transmitted through high-layer signaling.

(8) A Method for Applying an Adaptive CS According to Resource Allocation

In case of CDD or PSD, a result obtained by applying a large delay sample is as shown in FIG. 15 and a result obtained by applying a small delay sample is as shown in FIG. 16. The large delay sample implies that one or more cycles are satisfied within at least one resource block. CDD to which the large delay sample is applied can be used to increase a diversity gain. CDD to which the small delay sample is applied can obtain a great gain if frequency resources are sufficiently allocated.

In the method for applying the adaptive CS according to resource allocation, a CS is applied by comparing a size of a radio resource allocated to a UE with a threshold value. For example, the size of the allocated radio resource may be equal to the number of resource blocks. If the size of the allocated radio resource is greater than the threshold, the small CS can be applied. Otherwise, if the size of the allocated radio resource is less than the threshold, the large CS can be applied.

(9) A Method for Applying a Small Delay CDD According to Resource Allocation

The small CS can be applied according to resource allocation. If using the method for applying the small CS, the less the CS value for each antenna with respect to a reference CS value, the less the interference acting on a channel using another reference CS value. Therefore, it is preferable to obtain a sufficient diversity gain by using a minimum CS according to the number of resource allocations such as resource blocks. For this, the CS value may be configured to be a phase shift of one cyclic within a duration of allocated frequency resources.

The CS amount 'a' of Equation 4 above can be expressed by the following equation.

MathFigure 8

$$a = \frac{2\pi}{M \cdot N_{sub}} \qquad \text{[Math. 8]}$$

Herein, M denotes the number of resource blocks continuously allocated to the UE, and $N_{sub}$ denotes the number of subcarriers included in one resource block in a frequency domain.

If M×$N_{sub}$ is less than a specific size, the CS amount 'a' is expressed by the following equation so that a CS value for each of a plurality of antennas is located in an inner window.

MathFigure 9

$$a = \frac{2\pi}{N_{cycle}}, N_{cycle} = \max(N^{win}, M \cdot N_{sub}) \qquad \text{[Math. 9]}$$

Herein, $N^{win}$ denotes a window size.

(10) CS Hopping for a PUSCH

If a small number of resource blocks are allocated, it is difficult to obtain a sufficient frequency diversity gain according to the method for applying the small CS. Therefore, a CS may be hopped with a specific time interval within one subframe according to a determined rule so as to increase a time diversity gain. The specific time interval may be an SC-FDMA symbol, a slot, etc.

For example, one UE can use a CS value by changing the CS value on an SC-FDMA symbol basis or on a slot basis within one subframe. In this case, although the same frequency domain is used, the UE can perform transmission by varying a channel according to a time.

A slot-based hopping method can apply the small CS to both a DMRS and PUSCH data since the DMRS exists for each slot. An SC-FDMA symbol-based hopping method preferably identifies a channel for each antenna by applying a CS to the DMRS as shown in FIG. 15. That is, the SC-FDMA symbol-based hopping method preferably applies the small CS only to the PUSCH data.

Figure 17:
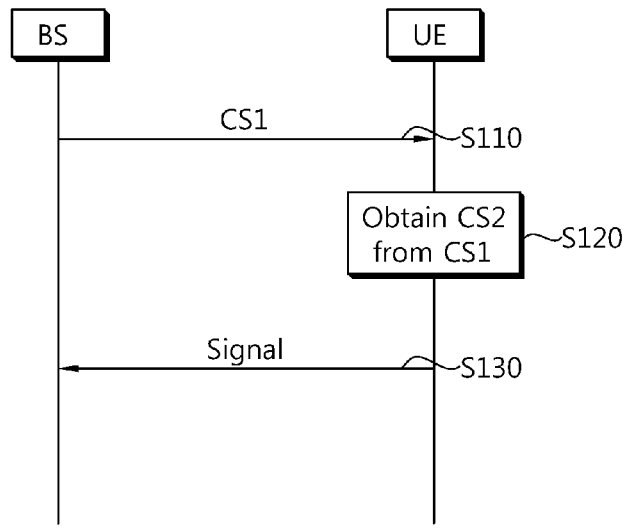
FIG. 17 is a flow diagram showing an example of a method for transmitting a signal in a multiple antenna system.

FIG. 17 is a flow diagram showing an example of a method for transmitting a signal in a multiple antenna system.

Referring to FIG. 17, a BS transmits information regarding a first CS value CS1 to a UE (step S110). The first CS value is a reference CS value. The UE obtains a second CS value CS2 from the first CS value CS1 (step S120). The number of second CS values may vary depending on the number of Tx antennas used by the UE. For example, if the number of Tx antennas is Nt, the UE obtains Nt−1 second CS values. The UE transmits signals, to which each CS value is applied, through each antenna (step S130). For example, if the UE uses two Tx antennas, the UE transmits a first signal, to which the first CS value is applied, through an Ant 1, and transmits a second signal, to which the second CS value is applied, through an Ant 2. The aforementioned method is applied to a method for transmitting information regarding the first CS value and a method for obtaining the second CS value.

Figure 18:
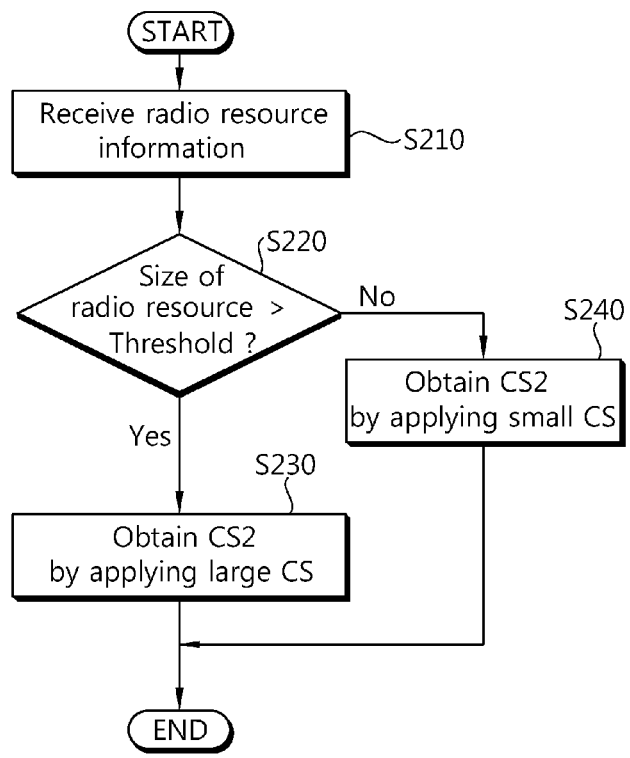
FIG. 18 is a flowchart showing an example of a method for obtaining a second cyclic shift value from a first cyclic shift value.

FIG. 18 is a flowchart showing an example of a method for obtaining a second CS value from a first CS value.

Referring to FIG. 18, a UE receives information regarding a radio resource allocated by a BS (step S210). The UE compares a size of the allocated radio resource with a threshold (step S220). If the size of the allocated radio resource is greater than the threshold, the second CS value is obtained by applying the small CS (step S230). Otherwise, if the size of the allocated radio resource is less than or equal to the threshold, the second CS value is obtained by applying the large CS (step S240).

As such, a method and an apparatus for effectively transmitting a signal in an SC-FDMA-based multiple antenna system can be provided. Therefore, the signal can be transmitted adaptively according to the number of UEs in a cell, and thus a UE can transmit a signal with high reliability in an environment where the UE moves in a high speed. Since limited radio resources can be effectively used, overall system performance can be improved.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for transmitting a signal in a wireless communication system, the method performed in a single user equipment (UE) comprising:
   receiving, at the single UE, via a physical downlink control channel (PDCCH), downlink control information (DCI) including a single cyclic shift value; and
   transmitting, at the single UE, in response to the DCI, each of demodulation reference signals (DMRSs) for a physical uplink shared channel (PUSCH) through at least two antennas including a first antenna and a second antenna by cyclic shifting the DMRSs based on at least two different cyclic shift values including a first cyclic shift value for the first antenna and a second cyclic shift value for the second antenna,
   wherein the first and second cyclic shift values are determined by the single cyclic shift value, and an offset between the first and second cyclic shift values is pre-defined based on a number of the plurality of antennas and a number of available cyclic shift values.

2. The method of claim 1, wherein the offset between the first and second cyclic shift values is pre-defined by one of $$\frac{N}{N_t}, \text{ceil}\left(\frac{N}{N_t}\right), \text{ and floor}\left(\frac{N}{N_t}\right),$$

where N denotes the number of available cyclic shift values and $N_t$ denotes the number of the at least two antennas.

3. The method of claim 1, wherein the UE is distinguished by the cyclic shift field.

4. The method of claim 1, wherein the demodulation reference signal (DMRS) is transmitted using a single carrier-frequency division multiple access (SC-FDMA) symbol and a subcarrier.

5. A user equipment (UE) comprising:
   a receiver configured for receiving, via a physical downlink control channel (PDCCH), downlink control information (DCI) including a single cyclic shift value; and
   a transmitter configured for transmitting, in response to the DCI, each of demodulation reference signals (DMRSs) for a physical uplink shared channel (PUSCH) through at least two antennas including a first antenna and a second antenna by cyclic shifting the DMRSs based on at least two different cyclic shift values including a first cyclic shift value for the first antenna and a second cyclic shift value for the second antenna,
   wherein the first and second cyclic shift values are determined by the single cyclic shift value, and an offset between the first and second cyclic shift values is pre-defined based on a number of the plurality of antennas and a number of available cyclic shift values.

6. The equipment of claim 5, wherein the offset between the first and second cyclic shift values is pre-defined by one of $$\frac{N}{N_t}, \text{ceil}\left(\frac{N}{N_t}\right), \text{ and floor}\left(\frac{N}{N_t}\right),$$

where N denotes the number of available cyclic shift values and $N_t$ denotes the number of the at least two antennas.

7. The equipment of claim 5, wherein the UE is distinguished by the cyclic shift field.

8. The equipment of claim 5, wherein the demodulation reference signal (DMRS) is transmitted using a single carrier-frequency division multiple access (SC-FDMA) symbol and a subcarrier.

* * * * *